3,080,276
DESTROYING INSECTS WITH HALOGEN SUBSTITUTED ALKENYLTHIOALKYL ESTERS OF PHOSPHORUS ACIDS

John P. Chupp, Kirkwood, Mo., assignor to Monsanto Chemical Company, St. Louis, Mo., a corporation of Delaware
No Drawing. Filed Feb. 1, 1962, Ser. No. 170,517
12 Claims. (Cl. 167—22)

This invention relates to a new class of organo phosphorus compounds, insecticidal compositions containing them and to methods of destroying insects. More particularly, the invention relates to halogen substituted alkenylthioalkyl esters of phosphorus acids, especially phosphorothioates.

The new compounds may be conveniently represented by the general formula

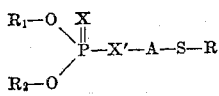

where $R_1$ and $R_2$ are hydrocarbon radicals, preferably lower alkyl radicals, X and X' are oxygen or sulfur, at least one preferably being sulfur, A is an alkylene radical, preferably methylene, and R is a halogen substituted alkenyl radical. Examples of $R_1$ and $R_2$ are methyl, ethyl, propyl, isopropyl, butyl, isobutyl, sec. butyl, amyl, isoamyl, allyl, phenyl, cyclohexyl, hexyl, octyl and decyl.

The radicals designated R may be selected from a variety of halogen substituted alkenyl radicals but is preferably a halogen substituted lower alkenyl group, as for example 2-chloroallyl, 2-bromoallyl, 3-chloroallyl, 3-iodoallyl, 2-fluoro-3-choroallyl, 3-bromo-2-butenyl, 3-chloro-2-butenyl, 2,3-dichloroallyl, 3,3-dichloroallyl, 2,3-dichloro-2-butenyl, 2,3-diodo-2-butenyl, 2,3-dichloro-4-bromobutenyl and 2,3,3-trichloroallyl.

While the new compounds are particularly valuable systemic insecticides, they have other uses. Thus they comprise useful mineral oil adjuvants in which they serve as antioxidants and to increase the load carrying capacity of mineral oil lubricants. The method of synthesis can vary as hereinafter described. The invention will be fully understood and apparent from the detailed examples which follow:

EXAMPLE 1

Into a suitable reactor is charged 15.7 grams (0.10 mole) of 2-chloroallyl thiomethyl chloride, 22.3 grams (0.11 mole) of ammonium O,O-diethyl phosphorodithioate and 100 ml. of acetone and the mixture refluxed for 4 hours. After cooling, the precipitated ammonium chloride is filtered and the salt cake washed with acetone. The filtrate is then stripped of acetone under vacuum, washed with water and taken up in methylene dichloride. The methylene dichloride solution is washed with water and then stripped to 100° C./5 mm. The O,O-diethyl S-(2-chloroallylthiomethyl)phosphorodithioate remains as an amber liquid in 96.0% yield. Analysis: 9.8% phosphorus, 11.9% chlorine and 31.3% sulfur as compared to 10.1% phosphorus, 11.6% chlorine and 31.4% sulfur calculated for $C_8H_{16}ClO_2PS_3$.

EXAMPLE 2

Substituting 20.6 grams (0.11 mole) of ammonium O,O-diethyl phosphorothioate for the phosphorodithioate in the procedure of Example 1, O,O-diethyl S-(2-chloroallylthiomethyl)phosphorothioate is obtained as an amber liquid in 93.0% yield. Analysis: 9.9% phosphorus and 22.0% sulfur as compared to 10.6% phosphorus and 22.0% sulfur calculated for $C_8H_{16}ClO_3PS_2$.

Other examples prepared by the same procedure as in Example 1 but substituting the appropriate reactants are summarized in tabular form below. All are amber oils.

Table I

| Example No. | Product | | Analysis, percent | |
|---|---|---|---|---|
| | | | Calcd. | Found |
| 3 | O,O-Diethyl S-(3,3-dichloroallylthiomethyl)phosphorodithioate. | P | 9.1 | 8.9 |
| | | Cl | 28.1 | 29.4 |
| | | S | 20.8 | 19.8 |
| 4 | O,O-Diethyl S-(3,3-dichloroallylthiomethyl)phosphorothioate. | P | 9.6 | 9.4 |
| | | S | 19.7 | 20.2 |
| | | Cl | 21.8 | 20.9 |
| 5 | O,O-Diethyl S-(3-chloroallylthiomethyl)phosphorodithioate. | P | 10.1 | 9.8 |
| | | S | 31.2 | 31.5 |
| | | Cl | 11.6 | 11.6 |
| 6 | O,O-Diethyl S-(3-chloroallylthiomethyl)phosphorothioate. | P | 10.7 | 10.3 |
| | | S | 22.0 | 22.6 |
| | | Cl | 12.2 | 12.0 |
| 7 | O,O-Dimethyl S-(3-chloroallylthiomethyl)phosphorodithioate. | P | 11.1 | 10.6 |
| | | S | 34.5 | 35.2 |
| | | Cl | 12.7 | 13.1 |
| 8 | O,O-Diisopropyl S-(3-chloroallylthiomethyl)phosphorodithioate. | P | 9.3 | 8.9 |
| | | S | 28.7 | 28.4 |
| | | Cl | 10.6 | 11.0 |
| 9 | O,O-Diethyl S-(3-chloro-2-butenylthiomethyl)phosphorodithioate. | P | 9.7 | 9.5 |
| | | S | 29.9 | 29.9 |
| | | Cl | 11.0 | 11.0 |
| 10 | O,O-Diethyl S-(3-chloro-2-butenylthiomethyl)phosphorothioate. | P | 10.2 | 9.3 |
| | | S | 21.0 | 21.9 |
| 11 | O,O-Dimethyl S-(2-chloroallylthiomethyl)phosphorodithioate. | P | 11.1 | 10.6 |
| | | S | 34.2 | 34.4 |
| | | Cl | 12.7 | 13.1 |
| 12 | O,O-Dimethyl S-(3,3-dichloroallylthiomethyl)phosphorodithioate. | P | 9.9 | 9.5 |
| | | S | 30.6 | 30.6 |
| | | Cl | 22.6 | 22.7 |
| 13 | O,O-Dimethyl S-(3-chloro-2-butenylthiomethyl)phosphorodithioate. | P | 10.6 | 9.5 |
| | | S | 32.9 | 34.0 |
| | | Cl | 12.1 | 12.6 |

EXAMPLE 14

A mixture of 15.2 grams (0.1 mole) of 2-(2-chloroallylthio)ethanol, 19.7 grams (0.1 mole) of O,O-diethyl phosphorochloridothioate, 10.1 grams (0.1 mole) of triethylamine and 100 ml. of benzene is prepared and the mixture heated at refluxing temperature for 4 hours in the presence of 0.2 gram of finely divided copper powder. The salt cake is filtered, washed with benzene and the filtrate and washings combined to be subsequently washed with 3% sodium carbonate solution, then twice with successive water washes. The solvent is stripped off to yield as the residue O,O-diethyl O-2-(2-chloroallylthio)ethyl phosphorothioate as a mobile liquid.

EXAMPLE 15

Substituting 0.1 mole of diethyl phosphorochloridate for diethyl phosphorochloridothioate in the foregoing procedure yields diethyl 2-(2-chloroallylthio)ethyl phosphate.

EXAMPLE 16

A mixture of 80 grams (0.43 mole) of O,O-diethyl phosphorodithioic acid and 47.0 grams (0.43 mole) of 2-chloroallylmercaptan is prepared and 38 grams (0.46 mole) of 37% aqueous formaldehyde added during 45 minutes. The reactants are stirred for about 3 hours without heating and then stirred at about 90° C. for 3 hours longer. The product is separated from the water layer, washed twice with water and stripped of volatiles by heating on a steam bath in vacuo. The residue, O,O-diethyl S-(2-chloroallylthiomethyl)phosphorodithioate is an amber liquid.

EXAMPLE 17

A mixture of 17.1 grams (0.10 mole) of 2-chloroallyl thioethyl chloride, 22.3 grams (0.11 mole) of ammonium O,O-diethyl phosphorodithioate and 100 ml. of acetone is prepared and the mixture refluxed for 4 hours. After cooling, the precipitated ammonium chloride is filtered and the salt cake washed with acetone. The filtrate is then stripped of acetone under vacuum, washed with water and taken up in methylene dichloride. The methylene dichloride solution is washed with water and then stripped to 100° C./5 mm. The O,O-diethyl S-(2-chloroallylthioethyl)phosphorodithioate remains as an amber liquid.

EXAMPLE 18

Substituting 20.6 grams (0.11 mole) of ammonium O,O-diethyl phosphorothioate for the phosphorodithioate in the procedure of Example 17, O,O-diethyl S-(2-chloroallylthioethyl)phosphorothioate is obtained as a dark amber liquid.

The new compounds are useful for destroying a variety of insect pests by contacting the insect in its environment either directly or indirectly through translocation within the plant. The compounds may be applied in solution, emulsion, water dispersion or as a dust formulation wherein the active ingredient is distributed over a dry, free-flowing powder, as for example clays, including bentonite and attapulgite, or such materials as talc, diatomaceous earth, fuller's earth, chalk or calcium carbonate. Although most of the toxicants are insoluble in water, they are soluble in common organic solvents. They may be dispersed directly in water or a solution in an organic solvent emulsified in aqueous medium by the aid of a dispersing agent. As dispersing and wetting agents there may be employed soft or hard sodium or potassium soaps, alkylated aromatic sodium sulfonate, such as sodium dodecylbenzene sulfonate, an amine salt, as for example dibutylammonium dodecylbenzene sulfonate, alkali metal salts of sulfated fatty alcohols, ethylene oxide condensation products of alkyl phenols, or tall oil or higher mercaptans and other dispersing and wetting agents. Addition of alkyl sulfates, as for example methyl sulfate, is advantageous in some instances.

The required concentrations of active ingredients are small because of the high effectiveness of the new compounds. Sprays for application to agricultural crops may suitably be applied at concentrations of 0.001-1.0%. An acetone solution of O,O-diethyl S-(2-chloroallylthiomethyl)phosphorodithioate applied as a residual treatment to filter paper at a rate of 1 mg. per square foot gives 100% kill of the red flour beetle (*Tribolium castaneum*). Kills of 100% are also obtained from acetone solutions of O,O-diethyl S-(2-chloroallylthiomethyl)-phosphoroethioate applied at the rate of 5 mg. per square foot. Likewise 100% kill of mosquito larvae (*Aedes aegypti*) is obtained with O,O-dimethyl S-(3-chloro-2-butenylthiomethyl)phosphorodithioate at a concentration of 0.04 p.p.m. The test involves dissolving the compound in acetone, adding sufficient distilled water to an aliquot of this solution to provide 25 cc. having a concentration of 0.04 p.p.m. of the compound, transferring about 25 mosquito larvae to a test tube containing the aforesaid 25 cc. mass, stoppering the test tube, and holding the test tube for 48 hours at room temperature. Other insects to which the compounds are extremely toxic include southern armyworm (*Prodenis eridania*) and plum curculio (*Conotrachelus nenuphar*).

Systemic activity is demonstrated by immersing excised stems of bean plants in emulsions of the chemicals for 3 days. The leaves are then cut off, infected with the chosen insects and percent kill noted after 48 hours. In emulsions at concentrations of 0.1% and even at 0.001% or lower, high percent kills are noted against such insects as two-spotted mite (*Tetranychus telarius*), Mexican bean beetle (*Epilachna varivestis*) and cotton aphid (*Aphis gossypii*).

It is intended to cover all changes and modifications of the examples of the invention herein chosen for purposes of disclosure which do not constitute departures from the spirit and scope of the invention.

This application is a continuation-in-part of application Serial No. 757,124, filed August 25, 1958, now Patent No. 3,020,305.

What is claimed is:

1. An insecticidal composition comprising as the essential active ingredient a compound of the structure

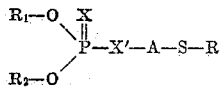

wherein $R_1$ and $R_2$ each represent a lower alkyl radical, X and X' represent a chalkogen having atomic weight less than 40, A represents a lower alkylene radical and R represents a halogen substituted lower 2-alkenyl radical.

2. An insecticidal composition comprising as the essential active ingredient a compound of the structure

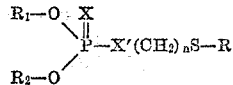

where $R_1$ and $R_2$ represent lower alkyl, X and X' represent a chalkogen having atomic weight less than 40, $n$ represents an integer at least 1 but less than 3 and R represents a halogen substituted allyl radical.

3. An insecticidal composition comprising as the essential active ingredient a compound of the structure

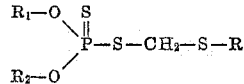

wherein $R_1$ and $R_2$ each represent a lower alkyl radical and R is a halogen substituted allyl radical.

4. An insecticidal composition comprising as the essential active ingredient a compound of the structure

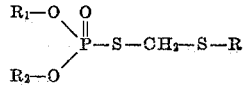

wherein $R_1$ and $R_2$ each represent a lower alkyl radical and R is a halogen substituted allyl radical.

5. An insecticidal composition comprising as the essential active ingredient a compound of the structure

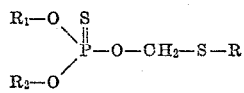

wherein $R_1$ and $R_2$ each represent a lower alkyl radical and R is a halogen substituted allyl radical.

6. An insecticidal composition comprising as the essential active ingredient O,O-dimethyl S-(3,3-dichloroallylthiomethyl)phosphorodithioate.

7. An insecticidal composition comprising as the essential active ingredient O,O-dimethyl S-(3-chloro-2-butenylthiomethyl)phosphorodithioate.

8. The method of destroying insects which comprises bringing the insect into contact with a compound of the structure

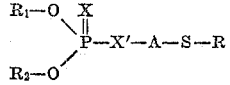

wherein $R_1$ and $R_2$ each represent a lower alkyl radical, X and X' represent a chalkogen having atomic weight less than 40, A represents a lower alkylene radical and R represents a halogen substituted lower 2-alkenyl radical.

9. The method of destroying insects which comprises bringing the insect into contact with a compound of the structure

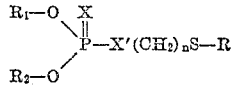

where $R_1$ and $R_2$ represent lower alkyl, X and X' represent a chalkogen having atomic weight less than 40, $n$ represents an integer at least 1 but less than 3 and R represents a halogen substituted allyl radical.

10. The method of destroying insects which comprises bringing the insect into contact with a compound of the structure

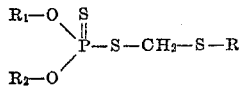

wherein $R_1$ and $R_2$ each represent a lower alkyl radical and R is a halogen substituted allyl radical.

11. The method of destroying insects which comprises bringing the insect into contact with O,O-dimethyl S-(3,3-dichloroallylthiomethyl) phosphorodithioate.

12. The method of destroying insects which comprises bringing the insect into contact with O,O-dimethyl S-(3-chloro-2-butenylthiomethyl) phosphorodithioate.

References Cited in the file of this patent
UNITED STATES PATENTS

| | | |
|---|---|---|
| 2,661,366 | Gamrath et al. | Dec. 1, 1953 |
| 2,678,329 | Gamrath et al. | May 11, 1954 |
| 2,786,009 | Pianfetti et al. | Mar. 19, 1957 |
| 2,861,912 | Sallman | Nov. 25, 1958 |

FOREIGN PATENTS

| | | |
|---|---|---|
| 1,113,363 | France | Dec. 5, 1955 |
| 795,340 | Great Britain | May 21, 1958 |

OTHER REFERENCES

Clark et al.: "J. Agr. Food Chem.," vol. III, pp. 834–6 (1955).